March 19, 1935.　　　O. W. LEWIS ET AL　　　1,994,776
MEANS FOR CUTTING SHEET MATERIAL
Filed Nov. 11, 1930　　　5 Sheets-Sheet 4
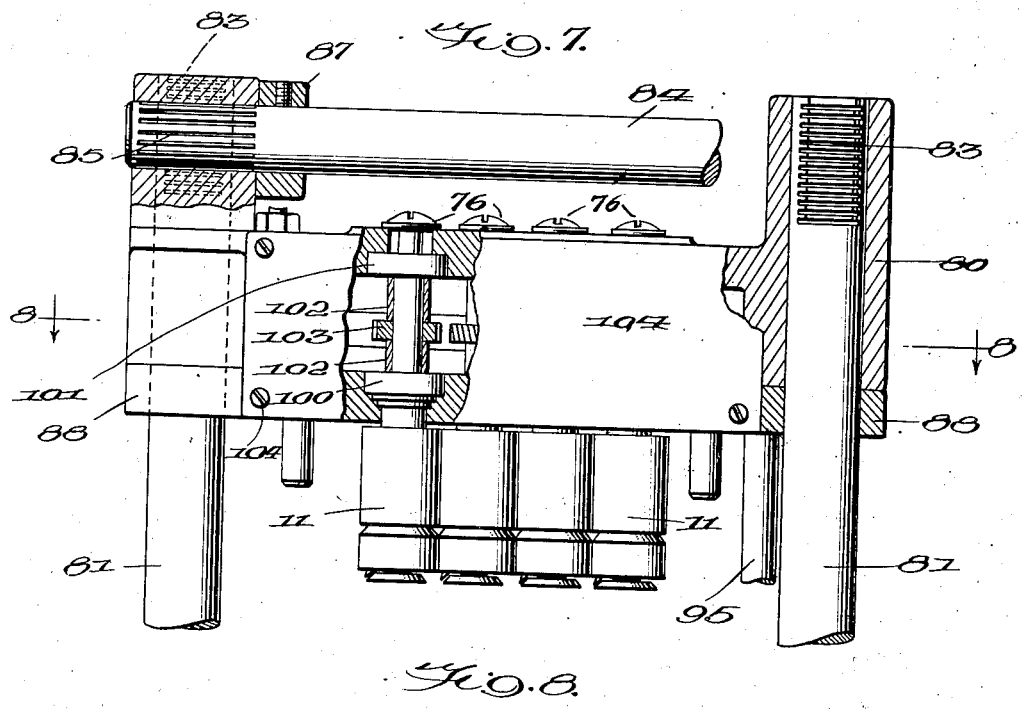
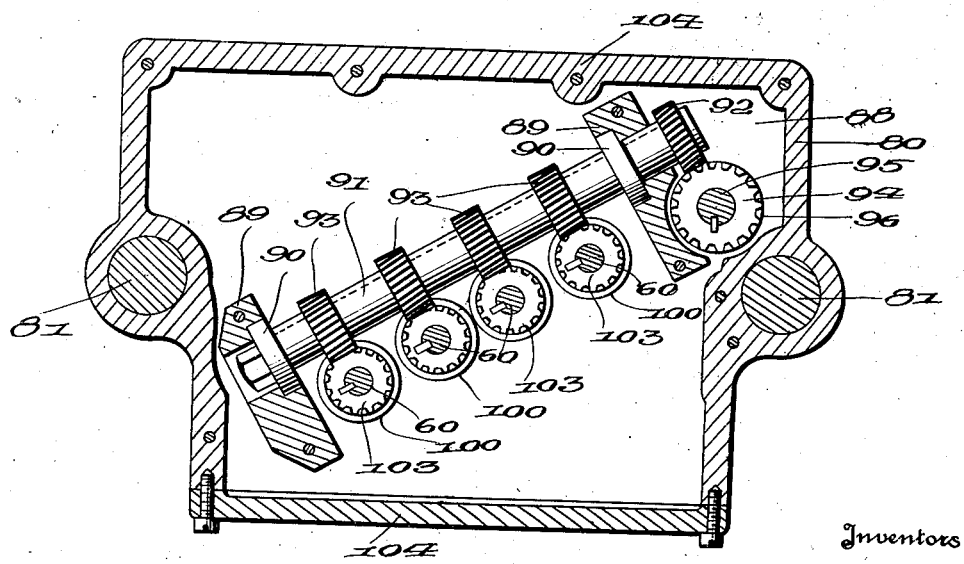
Inventors
Oscar W. Lewis.
John Durst
By Emery, Booth, Varney & Holcombe
Their Attorneys

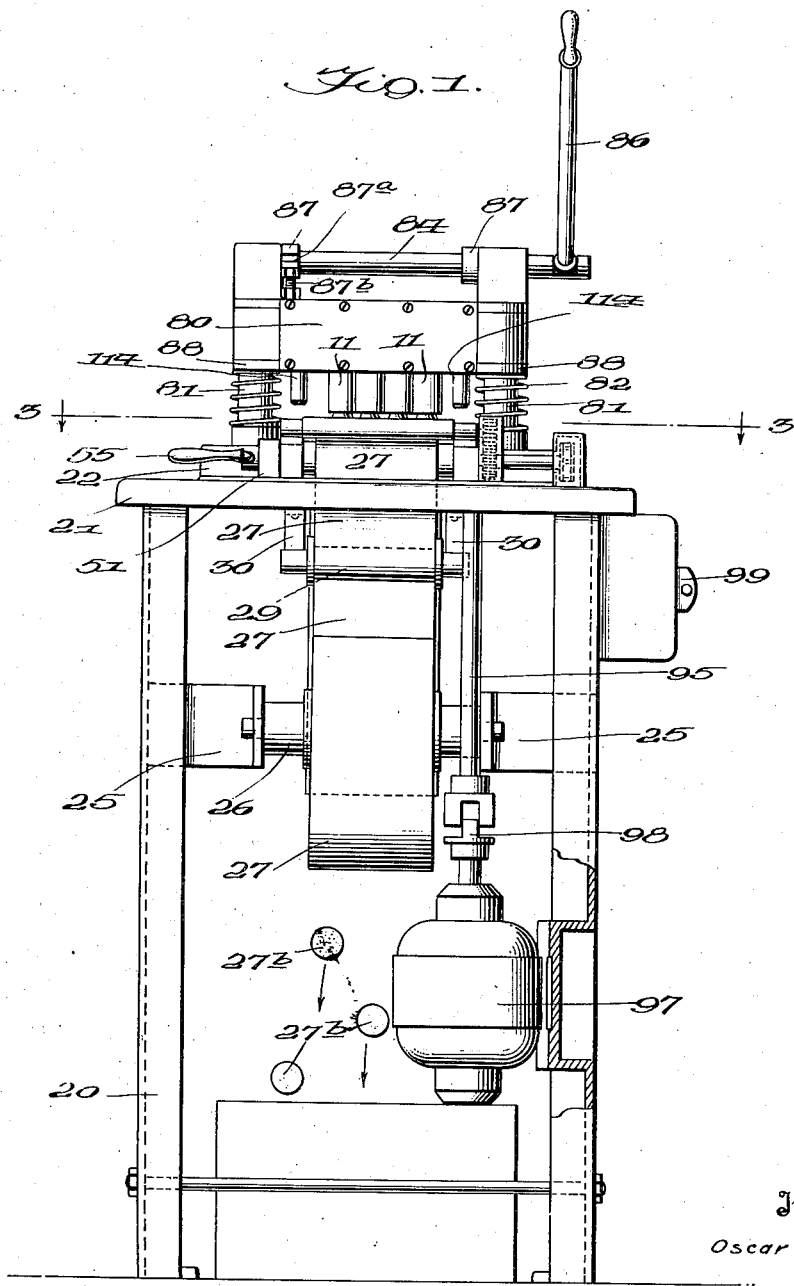

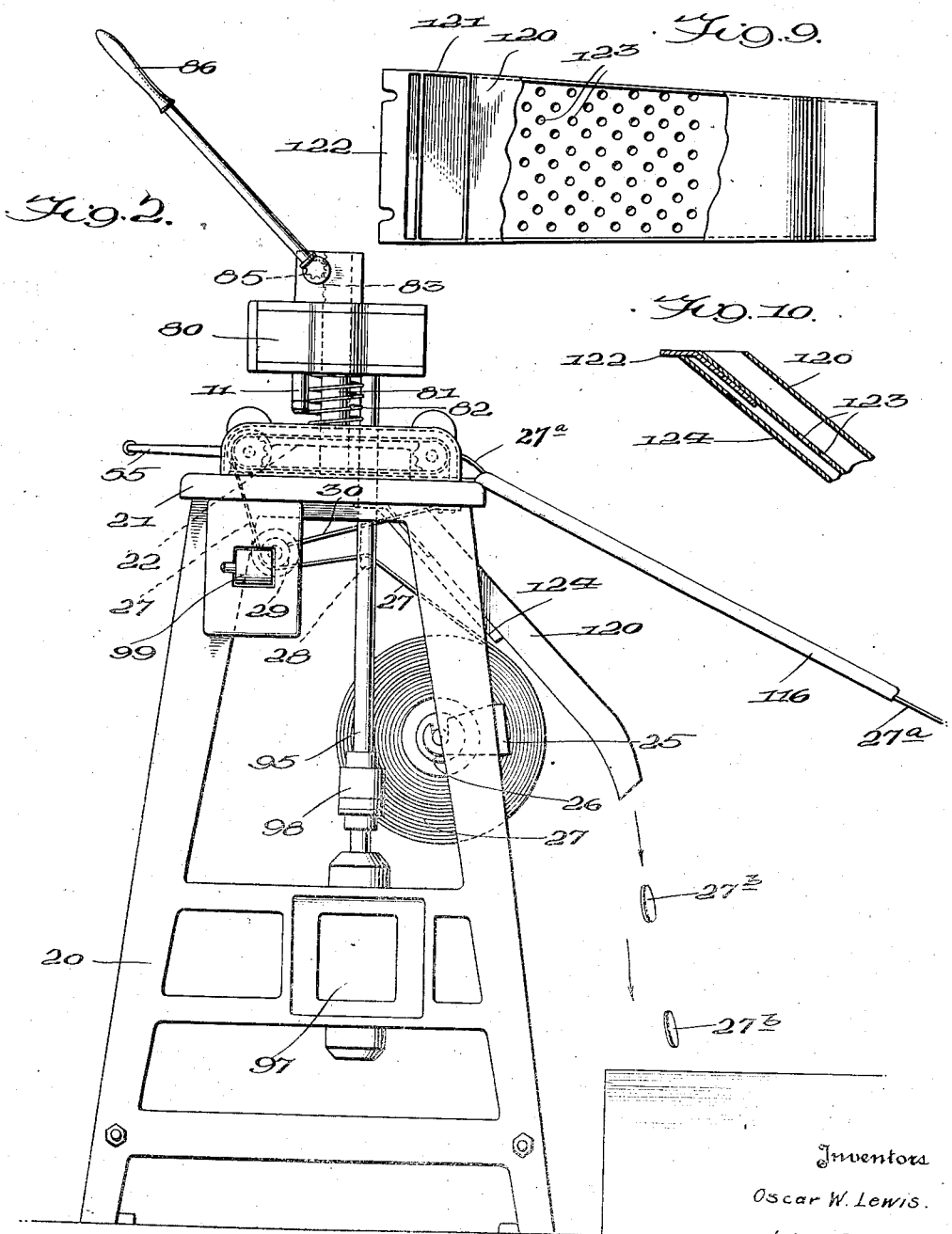

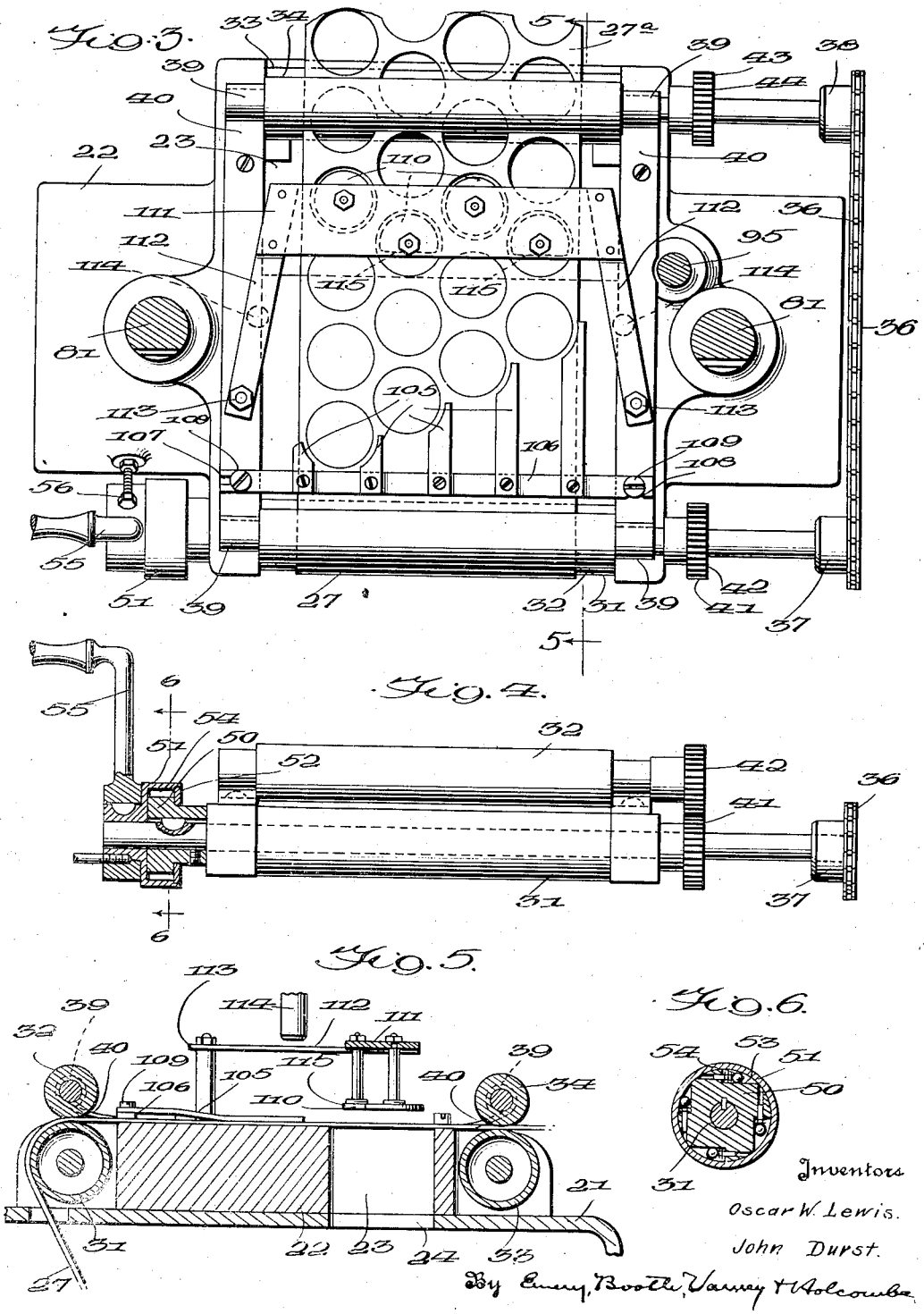

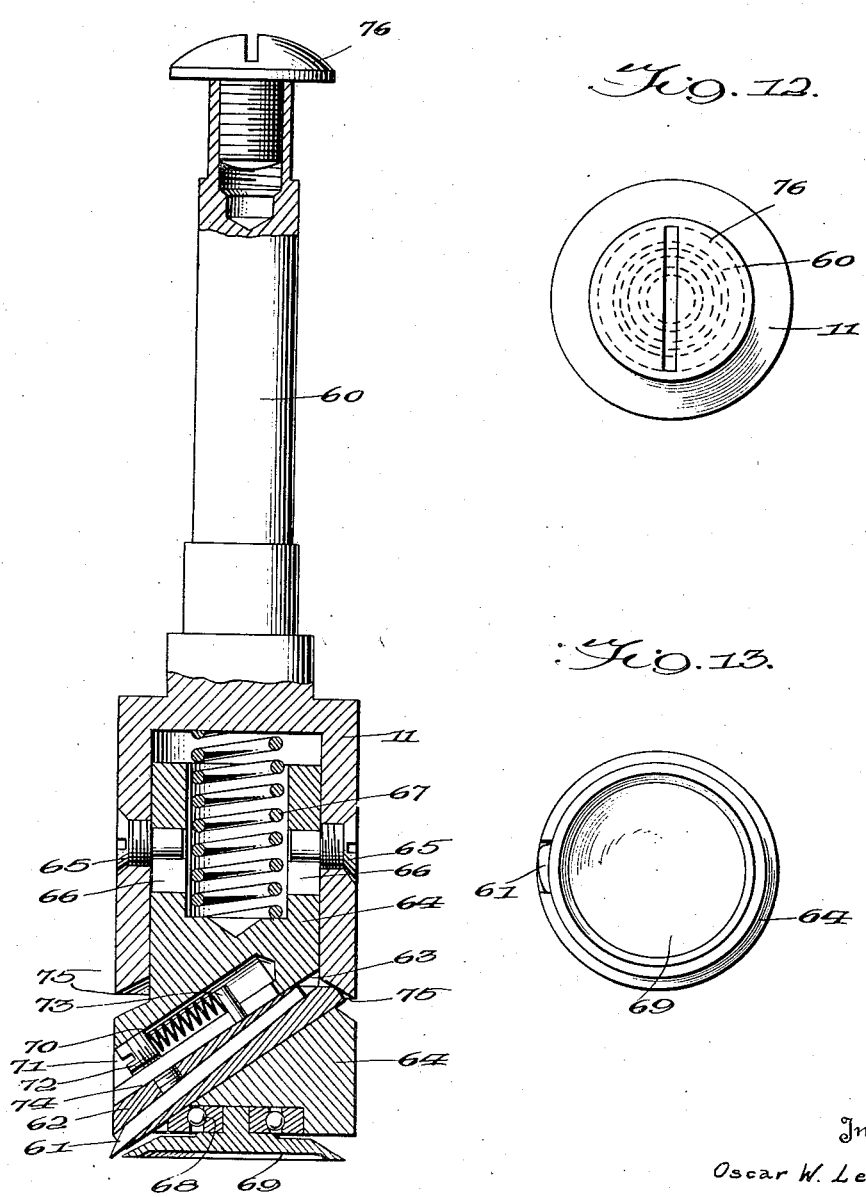

Patented Mar. 19, 1935

1,994,776

UNITED STATES PATENT OFFICE 1,994,776

MEANS FOR CUTTING SHEET MATERIAL

Oscar Wilbert Lewis and John Durst, Los Angeles, Calif., assignors, by mesne assignments, to Van Cleef Bros., Chicago, Ill., a co-partnership consisting of Noah Van Cleef, Maxime Van Cleef, Felix Van Cleef and Paul Van Cleef Application November 11, 1930, Serial No. 494,956

3 Claims. (Cl. 164—71)

This invention relates to the cutting of bevel edged patches from sheet material and aims particularly to provide an improved method of, and apparatus for, rapidly severing such patches from material difficult to sever satisfactorily, for example, laminated cold-patch material comprised of a plurality of plies of rubber in different stages of vulcanization, protected at one or both sides by a layer of Holland cloth or filled cambric.

It will be appreciated that methods and machines for severing such composite material must be designed particularly to avoid separation of the protective Holland cloth from the edges of the rubber patches being produced, and this invention aims to provide an improved method of, and apparatus for, rapidly severing patches from such composite material without separation of the Holland cloth at the severed edges.

The invention further aims to improve the mechanical arrangement and construction of machines operable according to our novel method.

Other objects and advantages of this invention will be apparent from the following detailed description of a preferred embodiment of the invention, illustrated in the drawings forming a part of this specification, in which Fig. 1 is a front elevation of an entire patch cutting machine;

Fig. 2 is a side elevation thereof;

Fig. 3 is a horizontal section taken on the line 3—3 of Fig. 1 in the direction indicated by the arrows and drawn to a larger scale, showing the cutting table and stripper in place;

Fig. 4 is a detail, partly in front elevation, and partly in section, of the front set of feeding rolls drawn to the same scale as Fig. 3;

Fig. 5 is a sectional side elevation of the feeding rolls, bed plate and ejector mechanism taken on the line 5—5 of Fig. 3;

Fig. 6 is a sectional view of the over-riding clutch mechanism for operating the feeding rolls, taken on the line 6—6 of Fig. 4 in the direction indicated by the arrows;

Fig. 7 is a detail of the machine head and the cutting spindles in front elevation;

Fig. 8 is a horizontal sectional view taken on the line 8—8 of Fig. 7 in the direction indicated by the arrows;

Fig. 9 is a detail view of the patch discharge chute and dust separator;

Fig. 10 is a partial mid-sectional detail of the same;

Fig. 11 is a sectional elevation of one of the cutting spindles;

Fig. 12 is a plan view of the same; and

Fig. 13 is a view of the under side or base view of the cutting spindle.

Referring to the drawings, the machine illustrated therein comprises a support or frame 20 having a top or table 21 upon which is mounted a base, platen, or bed 22 provided with an aperture 23 (see Figs. 3 and 5) aligned with an orifice 24 in the table top 21, to enable the ejection of severed patches therethrough as hereinafter described.

As it is preferable to feed the sheet material to the bed or platen 22 from a roll of patch material, means such as the hook-shaped journal bearings 25 (see Figs. 1 and 2) may be provided to receive and support a shaft or spool 26 carrying a roll of patch material 27. In the case of manually controlled machines, such as that shown, these journal bearings 25 are preferably located at the rear of the frame 20 to provide for the mounting thereon of a relatively large roll of patch material while providing knee room at the front of the machine for an operator who will customarily occupy a sitting position in front of the machine.

Guide rolls 28 and 29 are suitably mounted in the frame 20 below the table top and serve to guide the patch material 27 to the feeding means for advancing the material intermittently across the bed or platen 22 to position it for cutting. The guide roll 29 may be conveniently supported by spring arms 30 which tend to depress it to hold the sheet material taut.

Material feeding means

As is best shown in Figs. 3 through 6, the feeding means which we prefer to use comprises front feed rolls 31 and 32 and rear feed rolls 33 and 34 between which the sheet material is fed and which are suitably interconnected to move the sheet material across the bed 22 of the machine and maintain it flat thereon. In the preferred form shown, the lower front roll 31 and lower rear roll 33 are coupled for rotation at the same rate by an endless chain 36 which runs over equal sized sprockets 37 and 38 carried by said front and rear rolls, respectively; and the upper front and rear rolls 32 and 34 are mounted in journals 39 carried at the ends of leaf springs 40 which are secured to the platen and which press said upper rolls toward their companion lower rolls 31 and 33 to grip the patch material firmly therebetween. The rolls 32 and 34 are respectively driven from their companion rolls 31 and 33 by means of pairs of pinions 41—42 and 43—44, proportioned to impart to the presser rolls 32 and 34 the same surface speed as that of the rolls 31 and 33.

Any suitable means may be utilized to operate the feed rolls, and the means employed may of course be varied depending upon whether the machine is to be operated automatically or manually. The feed roll operating means preferred for use on the manually controlled form of machine illustrated comprises an overrunning clutch (see Figs. 3, 4 and 6) consisting of an inner driven member 50 suitably attached to the front lower feed roll 31, as by the key and set screw shown in Fig. 4, and a driving sleeve member 51 rotatable thereabout and held in position by a retaining ring 52 attached to the sleeve 51 and abutting a shoulder on the driven member 50. To effect clutching of the driving sleeve 51 to the driven member 50 with a minimum of backlash, it is preferable to use a clutching means comprising jamming surfaces 53 on the driven member 50 and clutching rollers 54 spring pressed to engage between these jamming surfaces 53 and the driving sleeve 51. Referring to Fig. 6, this construction insures jamming of the clutching rollers 54 and driving of the driven member 50 immediately on clockwise movement of the driving sleeve 51, and insures immediate release of these parts on counter-movement of the driving sleeve 51, thereby constituting an over-running clutch.

A lever 55 suitably connected to the driving sleeve 51, as by the key and set screw shown, provides for the manual operation of the overrunning clutch to rotate the feed rolls in feeding direction. This lever normally rests upon the edge of the support or table 21 in position to be raised by the operator to advance the patch material between operations of the cutting head. A stop means such as the adjustable screw 56 shown in Fig. 3, limits the throw of the lever 55 to just such a fraction of a turn as will advance the patch material the requisite distance to enable the cutting of perfect patches with a minimum of waste.

Cutting spindles

Referring to Figs. 1, 2, 7 and 8 the cutting mechanism comprises a plurality of rotating cutting spindles 11, shown in detail in Figs. 11 through 13. As there indicated, each of these cutting spindles comprises an inclined cutting member which may take any form suitable for severing the material from which the patches are to be cut, means for moving said cutting member in a predetermined closed path, and means for advancing said cutting member into the work while it moves along said path, thereby to cut from the material a bevel-edged section of predetermined shape.

In the specific form of the invention illustrated, there are four cutting spindles 11 designed to cut circular bevel-edged patches and each spindle comprises a shank 60 adapted to be received in suitable holding and driving means provided in the vertically sliding head of the machine to be rotated and advanced toward the work thereby. The cutter member or cutting tool in the embodiment shown comprises a knife 61 carried in a knife holder 62, which is slidably mounted in an inclined position in a downwardly inclined guiding passage 63 formed through a rotatable spindle-body 64. The spindle body 64 is longitudinally movably attached to the shank 60 so as to have limited axial movement with respect thereto, as by the pin and slot members 65 and 66, and is normally held in extended position with respect to the shank 60 by a relatively strong spring means 67. The knife carrying spindle body 64 has a rotary bearing 68 at its end, such as the ball and thrust bearing (as shown in Fig. 11) in which is mounted a presser-plate or presser-foot 69, which is adapted to bear against the work as the rotating-unit is advanced by the machine to hold the work firmly and motionless while the bearing mounting 68 allows the remainder of the spindle to rotate freely to drive and advance the cutter member.

In the form shown, the knife holder is resiliently urged into knife retracting position by suitable yielding means such as a compression spring 70 fitted into a bore 71 in the spindle body and held between a follower screw 72 and a pin 73 which is affixed to the knife holder 62 and projects into the bore 71 through a slot 74; and the knife holder is retained in such retracted position while the cutter spindle is retracted from the work and until it is advanced against the work with sufficient force to compress the spring 67 and bring into play the means for advancing the knife. This means in the embodiment shown comprises a cam surface 75 carried by the shank 60 in position to engage the butt end of the knife holder 62 to advance the cutting tool through the guiding passage and into the work. It will be noted that according to this invention a long bevel is obtained with a unit of small cross-section by extending the knife holder entirely through the axis of the cutter unit and acting upon the same at the opposite side of the unit from that at which the cutting is effected.

Machine head and spindle mounting

As shown in Figs. 1, 2, 7 and 8, the machine head 80, in which a plurality of these spindles or cutter units 11 are mounted as hereinafter described, is guided for vertical movement by parallel columns or pillars 81 fixed in the base or platen 22 of the machine. Heavy compression springs 82, or the like, surrounding the columns, serve to maintain the head in elevated position, as shown, while permitting ready lowering thereof by a suitable means. In the embodiment shown (see Figs. 2 and 7) such lowering means is provided by the cutting of rack teeth 83 on the columns 81 and the provision of a shaft 84 having pinion formed ends 85 journaled in the head 80 and engaging the rack teeth 83, and adapted to be rotated by a lever 86 (see Figs. 1 and 2) for lowering the head against the resistance of the compression springs 82. As indicated in Figs. 1 and 7, collars 87 or other suitable means serve to prevent displacement of shaft 84, and suitable adjustable stop means such as a lug 87a on the collar 87 (see Fig. 1) and an adjustable screw 87b on the machine head, serves to limit the downward movement of the head to prevent injury to the cutters as hereinafter described.

As is best shown in Figs. 7 and 8, the machine head 80 comprises a lower plate 88 upon which are mounted a plurality of journal blocks 89 carrying anti-friction bearings 90 which rotatably support a countershaft 91 having at one end a driven gear 92, and provided intermediate said bearings with a plurality of driving gears 93, equally spaced, and attached thereto in any suitable manner. Meshed with said driven gear 92 is a driving gear 94, preferably arranged with its axis vertical, as shown, which gear 94 is fixed to a vertical drive shaft 95 suitably mounted in an anti-friction bearing 96 carried by the lower plate 88. As best shown in Figs. 1 and 2 this drive shaft 95 passes through the bed 22 and table 21 of the machine, and is provided with a sliding or extensible coupling for connecting it to a motor 97 carried by the frame 20, to be driven thereby, the extensible coupling being indicated at 98. A suitably positioned switch 99 serves to start and stop the motor 97.

The above recited arrangement of parts provides for driving of the countershaft 91 while allowing the entire machine head 80 carrying the same to be reciprocated vertically on the columns 81; and while the means shown for performing this function is simple and desirable, other means for effecting such drive may of course be employed without departing from our invention.

Suitable chucks are provided for receiving and holding the shanks 60 of the cutting spindles 11, and in the form shown these chucks comprise radial and thrust bearings 100 mounted in the lower plate 88 of the machine head 80; journal bearings 101 mounted in alignment therewith in the top of the body portion of the head 80, and sleeves 102 carrying gears 103 mounted between said bearings; and adapted to be keyed to said shanks 60 when the latter are inserted in the thus formed chucks, so that upon tightening of the retaining screws 76 at the top thereof rotation of said gears 103 by the driving gears 93 carried by the countershaft 91, with which said gears 103 are respectively meshed, will effect rotation of the cutting spindles 11.

A removable cover plate 104 at the front side of the head 80 provides access to the interior thereof, as is desirable when using the form of chuck shown, although when using other forms of chuck and shank, such as a tapered chuck and shank, such access might not be necessary.

As is clearly shown in Figures 7 and 8, the several cutting spindles are arranged along a line at 60° to the direction of movement of the patch material 27, to thus provide for obtaining the maximum number of patches from the strip of material 27, by staggering adjacent circular cuts to reduce the waste to a minimum. Such arrangement also enables the operator to know just how far to feed the strip 27 between cuts, as the proper extent of feed under these conditions, will be equal to the spacing of the cutters, so that when cutting 1 5/16 inch patches with spindles spaced 1½ inches on centers to position the patches as closely together as possible, a feed of 1½ inches between cuts will space the adjacent patches produced by successive cuts equally closely together, it being understood that because of the 60° relationship, any three adjacent patches will then lie at the corners of an equilateral triangle of 1½ inch base lengths. This arrangement therefore facilitates proper pre-setting of the feed adjusting screw 56 (Fig. 3).

As best shown in Figs. 3 and 5, means is provided for smoothing the rubber material 27 against the bed or platen 22 and to hold it in position preceding and following the cutting operation. This means comprises a plurality of spring presser fingers 105 carried by a removable spring presser bar 106, having a longitudinal slot 107 at one end and a transverse slot 108 at the other end, adapted to be engaged under cap screws 109 to enable ready removal of the presser fingers to facilitate the introduction of the leading end of a new strip of rubber 27 into the machine.

These presser fingers 105 bear against the rubber sheet closely adjacent the cutting point, as shown, and prevent its being twisted when the cutting spindles 11 first contact with the same before sufficient pressure is brought to bear thereon to firmly clamp the rubber between the presser feet 69 and the bed 22.

*Ejectors and chutes*

As above mentioned the bed 22 and floor 21 are apertured at 23 and 24 respectively (see Fig. 5) to provide a passage for the ejection of the severed patches from the sheet of patch material. The ejection is accomplished by suitable means best illustrated in Figs. 3 and 5, which comprises a plurality of ejecting members 110 in the form of plungers slightly smaller than the patches being cut, supported above the orifice 23 by an ejector carrying plate 111 in position to overlie the severed patches advanced over said orifice 23 by the intermittent feed of the sheet material 27. Preferably the ejector carrying plate 111 is supported by two spring arms 112, mounted on posts 113 fixed in the machine bed 22 laterally of the path of the rubber strip 27. The ejectors may be operated simultaneously with the depression of the cutter spindles to hold the sheet against movement by studs 114 fixed to the underside of the head 80 in position to strike the springs 112, or any other part of the spring mounted assembly, as the head is lowered, to thus depress the plungers 110 and force the patches out of the skeleton 27a and downwardly through the passage 23—24, into a dust separating chute hereinafter described. As indicated at 115, if it is desired to limit the width of the orifice 23, the plungers may be cut away to enable them to pass through the skeleton 27a and into the said orifice to force the patches therethrough.

It will be appreciated that the patch ejecting means may be located and arranged as desired without departing from our invention, though we consider the arrangement shown to be advantageous from the standpoints of symmetry and compactness.

After the ejecting of the patches from the skeleton 27a, the latter may be conducted from the machine by any suitable guide or support 116 (see Fig. 2) to be re-rolled for reclamation or other use, and the severed patches 27b fall into a dust separating chute as shown in Fig. 2. As best shown in Figs. 9 and 10, this chute comprises a tubular body 120 having its upper end cut off at an angle as indicated at 121, and provided with a flange 122 adapted to be bolted or otherwise secured to the underside of the table or top 21 in position to align the tubular body 120 with the patch discharge aperture 24.

For a portion of its length the bottom wall of this tubular body 120 is provided with perforations 123 through which may pass any dust or scraps accompanying the patches, so that only the patches 27b will be delivered by the chute 120. As indicated at 124 any suitable receptacle for retaining the dust may be attached to the underside of the perforated area of the chute.

Operation

Bevel-edged patches may be cut by the machine described from composite sheet material comprised of rubber and protective cloth, without separation of the cloth at the edges of the patches and with a minimum of waste, the operations being as follows:

The operator having inserted the leading end of the rubber strip in the machine will operate the feed lever 55 to position the material for the first cut, after which he will throw the switch 99 to start the motor 97, which, through the extensible shaft 98—95 and the countershaft 91, rotates the cutting spindles at a relatively rapid rate. The operator then pulls down the lever 86 to lower the cutter carrying head 80, which lowers the rotating spindles 11 against the rubber sheet 27, the spring fingers 105 preventing twisting of the rubber by the first contact of the rotating spindles. After contact of the spindles 11 with the rubber, rotation of the presser feet 69 ceases, and the continued descent of the head 80 presses the presser feet 69 tightly against the rubber, while compressing the springs 67 in the cutter spindles, and pressing the rubber and Holland cloth tightly together to prevent any separation thereof. The compression of the springs 67 brings the camming surfaces 75 against the knife holders 62 to advance the rotating knives 61 into the firmly held and partially compressed material. By advancing the knives into the work during the cutting operation, any tendency thereof to cause separation of the rubber from the Holland cloth is avoided, and actually a tendency to tightly press or wipe the two together at the edges of the patches and improve the edge adherence is developed.

The stop means 87a—87b may be adjusted so that the head 80 will be advanced just sufficiently to force the knives substantially completely through the composite material without cutting into the bed 22 to any appreciable extent, and as the bed 22 is preferably made of relatively soft metal, dulling of the knives 61 is thereby avoided. Having pulled the lever 86 all the way down the operator will allow it to return to its initial position during which return the head 80 will be raised by the heavy springs 82, lifting the cutting spindles 11 from the work.

The operator next lifts the feed lever 55 until it is stopped by the stop means 56, previously properly adjusted, thus feeding the material to the next position for cutting. He then again lowers the head 80 to cut another series of patches and actuate the ejectors 110; and merely continues the alternate operation of the levers 55 and 86 until the entire roll of patch material 27 has passed through the machine. If the end of the roll of material is cut square, due to the diagonal arrangement of the spindles, during the last cut or two one or more of the spindles may not contact with the rubber material; but this can result in no harm to the knives as the absence of the rubber beneath the presser feet of these spindles will allow the spindle as a whole to advance until the presser foot reaches the bed 22 so that compression of the spring 67 will be reduced to such an extent that the knife 61 will not be forced into the platen 22.

For facilitating understanding of our invention we have described a simple manually controlled form of machine embodying the same, but any suitable mechanical means can obviously be applied to alternately lower the head 80 and operate the feed rolls 31, 32, 33, 34 to render the machine entirely automatic without departing from our invention; and by describing a particular embodiment of our invention for the purpose of illustrating the same we do not intend to limit our invention to the details thereof, but comprehend as our invention such devices as fall within the scope of the appended claims.

The method aspects of our invention, according to which our machine is designed to operate, comprise, as above set forth, the several steps of feeding of the material which provide for the rapid severing of the patches with a minimum of waste; the step of holding the material in cutting position after its advance thereto; the mode of holding or clamping the material for cutting to avoid separation of the Holland cloth and rubber; the manner of cutting to avoid edge separation; and other novel features of the mode of handling and operation upon the sheet material; individually and in such novel combinations as are particularly pointed out in the appended claims.

Having thus described detailed embodiments of the several features of our invention, we claim as our invention:

1. In a machine of the class described, the combination of a bed, means for intermittently feeding composite sheet material across said bed, and means for severing a plurality of bevel-edged sections therefrom comprising a head movable vertically with respect to said bed and provided with a plurality of chucks, means for conjointly rotating said chucks, and a cutting spindle mounted in each of, and rotatable with, said chucks and comprising a shank, a spindle-body telescopically mounted thereon, means for causing said body to rotate with said shank, resilient means urging said body to an extended position with respect to said shank, a presser-foot rotatably mounted at the extremity of said body, a knife extending outwardly and downwardly with respect to said body, means for normally retracting said knife to a position above the bottom of said presser-foot, and means operated by the telescoping of said body and shank for extending said knife outwardly and downwardly beyond the bottom of said presser-foot, substantially as and for the purpose described.

2. A machine of the class described, comprising in combination a bed, means for intermittently feeding composite sheet material across the bed, a head disposed over and movable vertically with respect to said bed, a plurality of vertically extending, rotatable spindles carried by the head so that they are arranged in a row that extends diagonally with respect to the course of travel of the sheet material across the bed and provided at the lower ends thereof with knives that extend and are slidable downwardly and outwardly and are adapted to cut bevel edged patch sections from the material, means for progressively sliding the knives outwardly and downwardly into the material for patch section cutting purposes during rotation of the spindles by the rotating means and downward movement of the head with respect to the bed.

3. A machine of the class described comprising in combination, a bed, means for intermittently feeding composite sheet material across the bed, a head disposed over and movable vertically with respect to said bed, a plurality of vertically extending, rotatable cutting spindles carried by the head in row form, provided at the lower ends thereof with presser plates for engaging and clamping the material against the bed during downward movement of the head and also provided at their lower ends with cutting knives that extend and slide downwardly and outwardly and are bodily rotatable around said plates, means for conjointly rotating the spindles, and means for progressively sliding the knives outwardly and downwardly into the material for patch section cutting purposes during rotation of the spindles by the rotating means and downward movement of the head with respect to the bed.

OSCAR WILBERT LEWIS.
JOHN DURST.